United States Patent [19]

Kemper et al.

[11] Patent Number: 4,660,867
[45] Date of Patent: Apr. 28, 1987

[54] COUPLED HOSE ASSEMBLY

[75] Inventors: Dennis C. Kemper; Douglas D. Schelhaas, both of Aurora, Colo.

[73] Assignee: The Gates Rubber Company, Denver, Colo.

[21] Appl. No.: 855,057

[22] Filed: Apr. 22, 1986

[51] Int. Cl.4 ............................................. F16L 33/20
[52] U.S. Cl. .................................. 285/256; 285/258; 285/915; 156/294
[58] Field of Search .................. 285/256, 258, 915; 156/294

[56] References Cited

U.S. PATENT DOCUMENTS

| 96,286 | 10/1869 | Thompson | 285/256 |
|---|---|---|---|
| 1,969,203 | 8/1934 | Cadden et al. | 285/256 X |
| 2,842,125 | 7/1958 | Stephany | 285/915 X |
| 2,920,910 | 1/1960 | Schnabel | 285/256 X |
| 3,343,252 | 9/1967 | Reesor | 285/915 X |
| 3,549,180 | 12/1970 | MacWilliam | 285/256 |
| 4,083,584 | 4/1978 | Buzzi | 285/258 |
| 4,353,581 | 10/1982 | Eisenzimmer | 285/915 X |

FOREIGN PATENT DOCUMENTS

| 64820 | 6/1978 | Japan | 285/256 |
|---|---|---|---|
| 68421 | 6/1978 | Japan | 285/256 |
| 667181 | 2/1952 | United Kingdom | 285/256 |

Primary Examiner—Thomas F. Callaghan
Attorney, Agent, or Firm—H. W. Oberg, Jr.; C. H. Castleman, Jr.; F. P. Grassler

[57] ABSTRACT

A coupled hose assembly of the type including a coupling attached to a polymeric hose by pinching part of a hose end portion. A pliable adhesive is disposed in part of the coupling to define a substantially leakproof seal between the hose and coupling at an environment temperature falling at least within the range of about 135° C. to about −40° C.

5 Claims, 2 Drawing Figures

COUPLED HOSE ASSEMBLY

BACKGROUND OF THE INVENTION

The invention relates to coupled hose assemblies, but more particularly, the invention relates to an improved seal between a metallic coupling and a polymeric hose.

Metallic couplings typically have a male stem portion that is insertable into a hose bore and a ferrule portion that is concentric with the male stem portion. Together, the male stem and ferrule portions define an annular cavity for receiving a hose end. The coupling is retained by pinching part of a hose end between the ferrule and stem portions. Pinching is accomplished either by radially reducing the size of the ferrule, or by radially increasing the size of the male stem. In some applications, the ferrule may be attached to the stem by means of interlocking collars.

The problem to be reckoned with in all liquid transfer type hose assemblies is that of forming a liquid tight seal between a coupling and hose at expected operating temperature, pressure, and hose flexing conditions. Sealing is typically accomplished by pressing the bore of a hose against a stem, which may include a plurality of circumferential serrations. The elastomeric characteristics of a hose polymer are relied on to maintain pressure between the hose bore and stem as the hose is pinched between the ferrule and stem. While the resiliency of the hose and the pinched area may be sufficient to maintain pressure to effect sealing between the hose and coupling in most environments, problems can sometimes occur at low operating temperatures after the hose becomes "compression set" where it is pinched. Once "compression set", the hose has a rate of thermal contraction that is greater than that of the metallic coupling making the hose susceptible to "cold leaking" at the low temperatures of its expected operating environment as, for example, a temperature range of about 135° C. to about −40° C.

SUMMARY OF THE INVENTION

In accordance with the invention, a coupled hose assembly is provided that is substantially free of "cold leaks" at a hose assembly environment temperature falling at least within the range of about 135° C. to about −40° C. The invention solves the cold leak problem associated with "compression set" where the hose is pinched with a coupling and susceptible to a rate of thermal contraction that is greater than that of the coupling. A pliable adhesive is located in the coupling which adheres the hose and coupling together while also forming a substantially leakproof seal that is effective at the hose assembly environment temperatures within the range as above discussed.

Other aspects and advantages of the invention will be apparent after reviewing the drawings and the description thereof wherein:

FIG. 1 is a partial axial cross section of a coupled hose assembly of the invention; and FIG. 2 is an enlarged partial view taken along the line 2—2 of FIG. 1.

DESCRIPTION OF PREFERRED EMBODIMENTS

Figure 1:
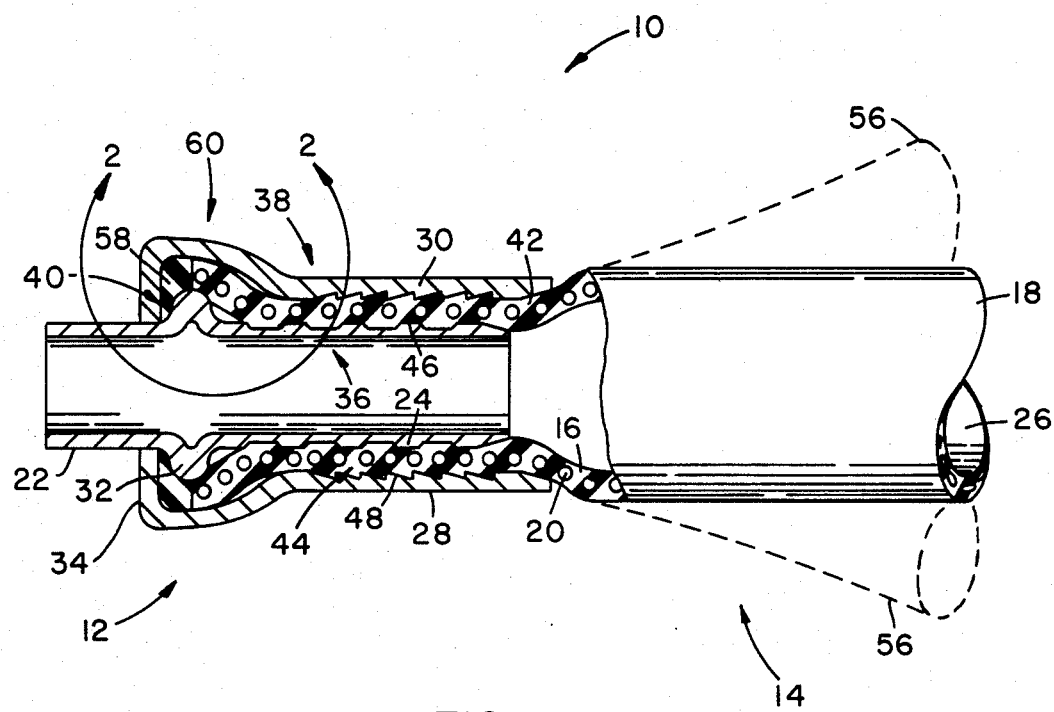

Referring to the FIGS., a coupled hose assembly 10 is provided that includes a coupling 12 and a hose 14. The hose is of the polymeric type and may be constructed with a tube 16 and cover 18 that sandwiched a twined reinforcement 20. Any suitable polymeric material may be used such as plastic, polyurethane, rubber, synthetic rubber, or blends thereof.

The coupling may be of the two-part type that includes a stem 22 having a portion 24 that is inserted into the bore 26 of the hose, and a ferrule 28 having a sleeve portion 30 that is concentric with the stem. The ferrule 28 may attach to the stem 22 such as by an external collar 32 formed as part of the stem and an internal collar 34 formed as part of the ferrule. Together, the stem and ferrule form walls 36, 38, a bottom portion 40, and an opening 42 of an annular cavity for receiving the polymeric hose in known fashion. Part 44 of a hose end portion is pinched between parts of the walls 36, 38. Pinching may be accomplished by crushing the ferrule, such as by crimping or swaging, or pinching may be accomplished by radially expanding part of the stem portion. As shown in the FIGS., pinching is accomplished by crushing part of the ferrule.

As the ferrule is crushed, the pinched part of the hose is reduced in thickness or reshaped in such a manner that the tube 26 is pressed against the ferrule wall 36 to effect at least a partial seal between the coupling and hose. Sealing in some situations is enhanced with the provision of a plurality of circumferential serrations 46 formed on the stem portion. Hose retention is sometimes enhanced with the provision of serrated circumferential grooves 48 formed on the internal part of the ferrule wall. Pinching the hose to press against the stem portion is usually effective for maintaining a liquid or airtight seal between the coupling and hose at an environment temperature following within a range of about 0° C. to about 100° C. While pinching is adequate to effect a seal at such warm temperatures, pinching is inadequate to effect a substantially leakproof seal at temperatures in a range from about 0° C. to about −40° C. because the rate of thermal contraction of the polymeric hose is greater than that of the coupling walls.

Figure 2:
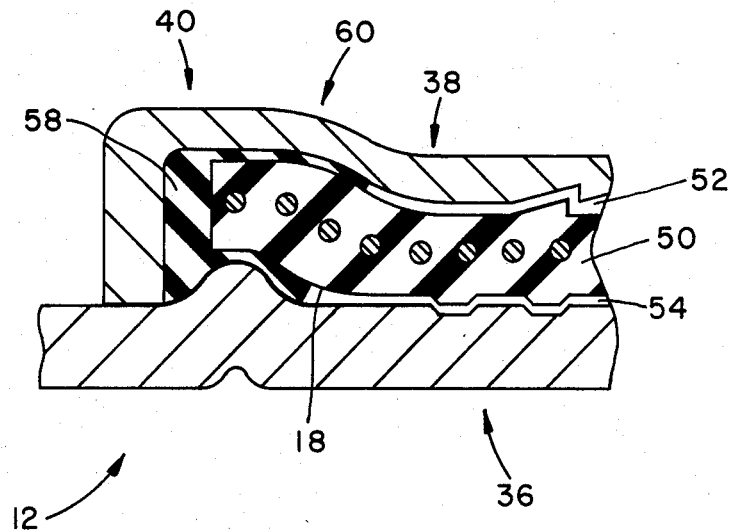

As illustrated in FIG. 2, the pinched hose portion may take a compression set 50 and thermally contract at a greater rate than the coupling walls leaving clearances 52, 54 between the hose and coupling as a potential leakage path. The leakage path may be enhanced where the hose is deflected 56 relative to the coupling as illustrated by the dotted line in FIG. 1. To solve such a "cold leak" leakage problem and as better illustrated by FIG. 2, a pliable adhesive 58 is disposed in the annular cavity adhering the hose 14 to the coupling 12. The adhesive, when cured, defines a substantially leakproof seal between the hose and coupling at an environment temperature falling at least within the range of about 135° C. to about −40° C., and substantially eliminates "cold leaks." An example of a suitable pliable adhesive is a mineral filled epoxy sold by 3M Company under their product specification 2216B/A.

In an alternate embodiment, the ferrule may be radially relieved 60 to such an extent that the end of the hose is substantially unpinched in the bottom portion 40 where the pliable adhesive is disposed to effect a seal.

To illustrate the effectiveness of the seal, a coupled hose assembly is built with a textile reinforced rubber hose and an appropriately sized coupling configured to that as illustrated by the drawings where a ferrule and sleeve together form walls, a bottom portion, and an opening of an annular cavity. A pliable adhesive of the type exemplified is disposed solely in the bottom portion. While the adhesive is still uncured, a hose end is inserted through the opening of and into the annular cavity to be in contact with the uncured adhesive. The ferrule is then crimped in a known fashion and the adhesive is allowed to cure. The so constructed hose assembly is cycled 10 times from −40° C. to 125° C. and then air pressure tested at room temperature at 100 psi under water. The coupled hose assembly of the invention did not exhibit any leakage. In a second test, the coupled hose assembly is exposed to recirculating fuel, such as "fuel C", at 12° C. and then 125° C. for a total of three cycles, after which it is exposed to −30° C. for 4 hours and then pressure tested at −30° C. While the hose assembly is being air pressure tested, the hose is deflected 25 mm at 150 mm away from the coupling to stress that portion of the hose pinched by the coupling. The coupled hose assembly of the invention did not exhibit any leakage when pressured to 100 psi.

The foregoing detailed description is made for the purpose of illustration only, and it is not intended to limit the scope of the invention, which is to be determined from the appended claims.

What is claimed is:

1. In a coupled hose assembly of the type including a coupling with a stem portion and a ferrule portion that together form walls, a bottom portion and an opening of an annular cavity; and a pre-cured polymeric hose with part of an end portion located in the annular cavity and pinched between parts of said walls, the pinched part of the hose having a rate of thermal contraction that is greater than that of the coupling walls at a hose assembly environment temperature falling at least within the range of about 135° C. to about −40°, wherein the improvement comprises:

a pliable adhesive disposed in the bottom portion of the annular cavity and adhering the precured hose to the bottom portion of the coupling while also forming a substantially leakproof seal between the hose and coupling at the environment temperature.

2. The coupled hose assembly as claimed in claim 1 wherein the adhesive is a mineral filled epoxy.

3. The coupled hose assembly as claimed in claim 1 wherein the hose portion is substantially unpinched juxtaposed the bottom of the annular cavity where part of the hose is adhered to the coupling.

4. The coupled hose assembly as claimed in claim 1 wherein the adhesive is located solely in the bottom portion of the annular cavity and adheres the hose solely to the bottom portion of the coupling.

5. In a method for attaching and sealing a coupling to an end portion of a precured polymeric hose which includes the steps of providing a coupling with a ferrule portion and stem portion which together form walls, a bottom portion and an opening of an annular cavity; and inserting a hose end portion through the opening and into the annular cavity; deforming at least one of the walls and pinching part of the hose portion and thereby attaching the coupling to the hose, the improvement comprising the steps of:

prior to the step of inserting, the step of placing an uncured adhesive in the bottom of the annular cavity; and curing the adhesive while simultaneously adhering the pre-cured hose to the bottom portion of the coupling and forming a substantially leakproof seal that is effective at least within the temperature range of about 135° C. to about −40° C.

* * * * *